United States Patent
Lopez et al.

(10) Patent No.: US 9,776,521 B2
(45) Date of Patent: Oct. 3, 2017

(54) VEHICLE AND CHARGING SYSTEM FOR A VEHICLE

(71) Applicant: FORD GLOBAL TECHNOLOGIES, LLC, Dearborn, MI (US)

(72) Inventors: Juan Lopez, Madison Heights, MI (US); John Paul Gibeau, Canton, MI (US); Nondo G. Basoukeas, Northville, MI (US); Susan Curry, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 14/667,170

(22) Filed: Mar. 24, 2015

(65) Prior Publication Data

US 2016/0280086 A1    Sep. 29, 2016

(51) Int. Cl.
*H01F 27/42*   (2006.01)
*B60L 11/18*   (2006.01)

(52) U.S. Cl.
CPC ....... *B60L 11/1818* (2013.01); *B60L 2270/30* (2013.01); *Y02T 10/7005* (2013.01); *Y02T 90/14* (2013.01)

(58) Field of Classification Search
CPC .............. B60L 11/1818; B60L 2230/12; B60L 2270/30; B60L 2270/34; Y02T 90/12
See application file for complete search history.

(56) References Cited

U.S. PATENT DOCUMENTS

| | | | |
|---|---|---|---|
| 3,656,100 A * | 4/1972 | Beltrami | B60R 25/10 307/10.3 |
| 9,193,270 B2 * | 11/2015 | Tanneberger | B60L 11/1818 |
| 2012/0083148 A1 | 4/2012 | Hirashita et al. | |
| 2012/0088382 A1 * | 4/2012 | Konchan | B60L 11/1818 439/153 |
| 2012/0238122 A1 | 9/2012 | Hirashita et al. | |
| 2013/0040486 A1 | 2/2013 | Kurumizawa et al. | |
| 2014/0285148 A1 * | 9/2014 | Osawa | H01R 13/639 320/109 |

OTHER PUBLICATIONS

SAE International, Surface Vehicle Recommended Practice, SAE Electric Vehicle and Plug in Hybrid Electric Vehicle Conductive Charge Coupler, Oct. 2012, 93 pgs., J1172TM Oct. 2012, www.sae.org.

* cited by examiner

*Primary Examiner* — Daniel Cavallari
(74) *Attorney, Agent, or Firm* — David Kelley; Brooks Kushman P.C.

(57) ABSTRACT

A vehicle is provided. The vehicle includes a charging port configured to couple to a connector of an external power source in order to recharge a battery, a lock to secure the connector to the charging port, an electrical actuator configured to transition the lock between a locked condition and an unlocked condition when energized and maintain the locked or unlocked condition when de-energized, and a mechanical lock override configured to transition the lock to the unlocked condition.

14 Claims, 4 Drawing Sheets

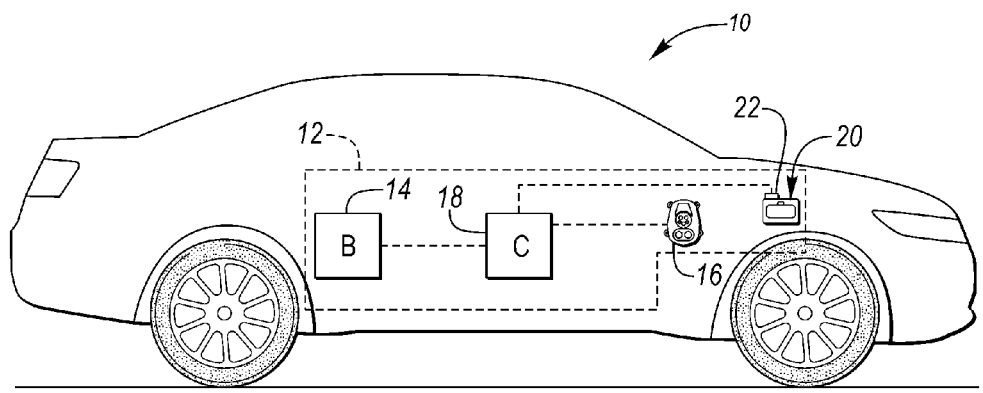
FIG. 1
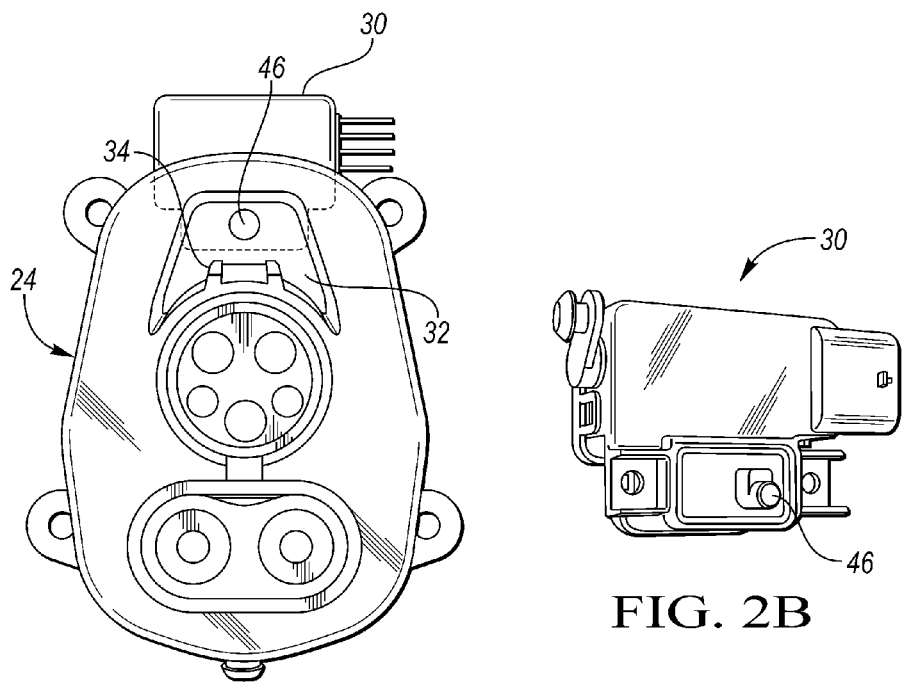
FIG. 2A
FIG. 2B

VEHICLE AND CHARGING SYSTEM FOR A VEHICLE

TECHNICAL FIELD

The present disclosure relates to charging systems for electric or hybrid vehicles.

BACKGROUND

Battery electric vehicles (BEVs) and plug-in hybrid vehicles (PHEVs) often include systems that secure the connector of an external power source to the charge port of the vehicle during battery recharging.

SUMMARY

A vehicle charging system is provided. The vehicle charging system includes a charging port configured to couple to a connector of an external power source in order to recharge a battery, a lock to secure the connector to the charging port when in a locked condition, an actuator configured to transition the lock between a locked condition and an unlocked condition when energized and maintain the locked or unlocked condition when de-energized, and a mechanical override configured to unlock the lock.

A vehicle is provided. The vehicle includes a charging port configured to couple to a connector of an external power source in order to recharge a battery, a lock to secure the connector to the charging port, an electrical actuator configured to transition the lock between a locked condition and an unlocked condition when energized and maintain the locked or unlocked condition when de-energized, and a mechanical lock override configured to transition the lock to the unlocked condition.

An electric vehicle is provided. The electric vehicle includes a charging port configured to couple to a connector of an external power source to recharge a traction battery, a lock configured to secure the connector to the charging port when in a locked condition, an electrical actuator configured to transition the lock between the locked condition and an unlocked condition when energized and maintain the locked or unlocked condition when de-energized, a release configured mechanically override the electrical actuator to transition the lock from the locked condition to the unlocked condition, an access door arranged to conceal the mechanical release when closed and permit access to the mechanical release when open, and a controller programmed to terminate a traction battery recharging operation in response to a signal indicating that the access door is open.

BRIEF DESCRIPTION OF THE DRAWINGS

FIG. 1 is a schematic diagram illustrating a vehicle charging system;

FIG. 2A is a front view of a first embodiment of a charging port for a BEV or PHEV;

FIG. 2B is an isometric view of a locking device that is secured to the charging port of FIG. 2A:

DETAILED DESCRIPTION

Figure 3:
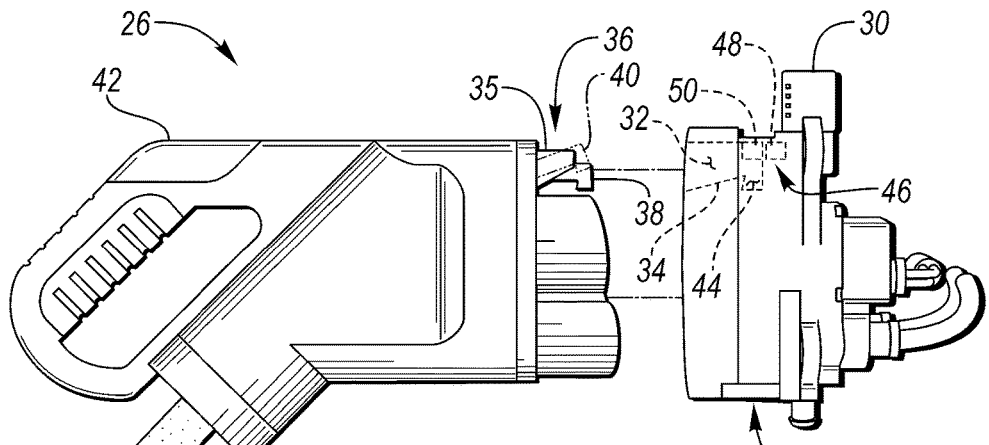
FIG. 3 is a side view illustrating a first embodiment of a connector from an external power source and the coupling between the connector and the charging port of FIG. 2A.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Referring to FIG. 1, a vehicle 10 is illustrated. The vehicle 10 may be a BEV or a PHEV. The vehicle 10 includes a charging system 12. The charging system 12 is configured to facilitate recharging of a vehicle battery 14. The vehicle battery 14 may be a traction battery that provides electrical power to a motor. The motor may provide motive power to the vehicle powertrain and wheels. The electric motor may also act as a generator in order to recharge the battery 14, in which case it would be for referred to as a motor/generator. The motor/generator may be utilized to recharge the battery 14 under various circumstances. For example, the motor/generator may recharge the battery 14 during regenerative braking, by recapturing motive energy during a hill descend, when an engine connected to the motor generator rotates the motor/generator, or any other method known in the art in which a motor/generator is used to recharge a battery 14 in an electric or hybrid vehicle.

The charging system 12 also includes a charging port 16 that is configured to couple with the connector of an external power source in order to recharge the battery 14. The charging system 12 may also include a controller 18, such as a vehicle onboard charger, that is connected to and in communication with both the battery 14 and the charging port 16. The controller 18 is configured to monitor and control various functions of the charging system 12. For example, the controller 18 may be utilized to execute, regulate, and terminate battery charging depending on various factors. The various factors may include, but are not limited to, the current charge level of the battery, the charging rate of the battery, factors that include protecting the components and/or circuits of the charging system 12 (e.g., surge protection), or safety factors (e.g., proper connection between the charging port 16 and the connector of the external power source).

The charging port 16 may include a locking device (or lock) that is utilized to secure a connector of an external power source to the charging port 16 during a battery recharging operation. The locking device may also be connected to and in communication with the controller 18. The locking device may include an electrical actuator to transition the locking device between locked and unlocked conditions when energized, and maintain the locked or unlocked condition when de-energized. A mechanical lock override 20 (also referred to as "mechanical override" or "release") may be connected to the locking device and configured to mechanically override the electrical actuator in order to transition the locking device to the unlocked condition. The mechanical lock override 20 may be required to decouple the connector of the external power source from the charging port 16 under circumstances where the electrical actuator has become nonfunctional and the locking device is in the locked condition. The mechanical lock override 20 may be sufficiently spaced apart from the charging port 16 so as to provide a safe distance from a charging connection when a user is attempting to manually override the locking device to decouple the connector of the external power source from the charging port 16.

The mechanical lock override 20 may include an access door. A sensor 22 may be configured to determine an open or closed condition of the access door. The sensor 22 may be connected to and in communication with the controller 18. The controller 18 may be programmed to terminate a battery recharging operation in response to receiving a signal indicating that the access door is in an opened position. The locking device and mechanical lock override 20 will be discussed in further detail below.

While illustrated as one controller, the controller 18 may be part of a larger control system and may be controlled by various other controllers throughout the vehicle 10, such as a vehicle system controller (VSC). It should therefore be understood that the controller 18 and one or more other controllers can collectively be referred to as a "controller" that controls various functions of the vehicle 10 and/or actuators in response to signals from various sensors. Controller 18 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

Referring to FIGS. 2A, 2B, and 3, first embodiments of a charging port 24, a connector 26 to an external power source 28, and a locking device 30 are illustrated. The charging port 24 includes profile details and electrical connections that are meant to mate with matching profile details and electrical connections of the connector 26. The profile of the charging port 24 includes a first receiving space 32 that engages at least one mating component 35 on the connector 26 and a ramping portion 34 that engages a retaining clip 36 on the connector 26. The retaining clip 36 may be biased in a lowered position 38 and configured to transition to a raised position 40 when a user actuates a release button 42 on the connector 26.

The connector 26 may be being inserted into the charging port 24 while the retaining clip 36 is in the raised position 40. The retaining clip 36 moves past the ramping portion 34 while in the raised position 40. Once the connector 26 has been completely inserted into the charging port 24, the release button 42 may then be released transitioning the retaining clip 36 into the lowered position 38. The tip of the retaining clip 36 descends into a void 44 located beyond the ramping portion 34 and engages a back side of the ramping portion 34 in order to secure the connector 26 to the charging port 24. The connector 26 may be retracted from the charging port 24 while the retaining clip 36 is in the raised position 40.

The locking device 30 is connected to the charging port 24. The locking device 30 transitions between an unlocked condition and a locked condition in order to lock or unlock the connector 26 to the charging port 24. The locking device 30 includes a locking pin 46. The locking pin 46 is located externally of the first receiving space 32 when in a retracted position 48 and is configured to protrude into the first receiving space 32 when in an advanced position 50. The locking device 30 may include an electrical actuator that advances the locking pin 46 between the retracted position 48 and advanced position 50 when energized, and maintain the retracted position 48 or advanced position 50 when de-energized. The locking pin 46 is configured to lock the connector 26 to the charging port 24 when in the advanced position 50 by preventing the retaining clip 36 from transitioning to the raised position 40 when the tip of the retaining clip 36 is extended into the void 44 and is engaging the back side of the ramping portion 34. When the locking pin 46 is in the retracted position 48 the connector 26 may be freely inserted or retracted from the charging port 24 by actuating the release button 42 and transitioning the retaining clip 36 to the raised position 40.

Figure 4A:
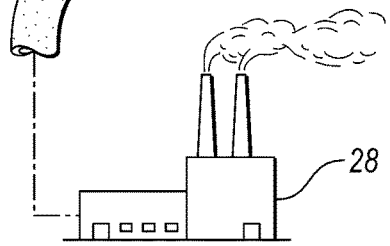
FIG. 4A is a front view of a second embodiment of the charging port for a BEV or PHEV.
Figure 4A:
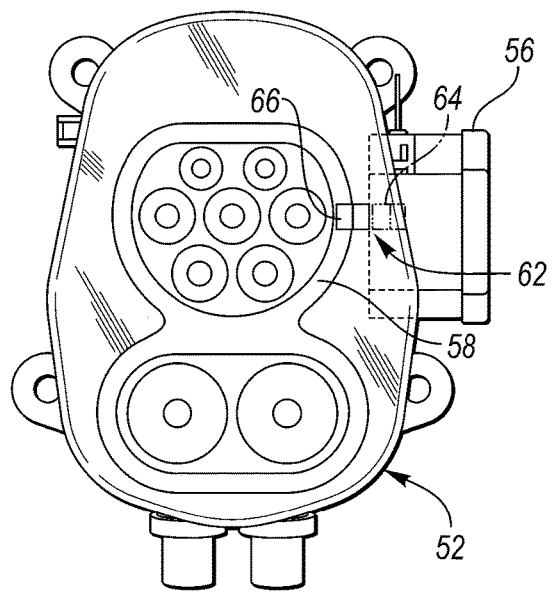
Figure 4B:
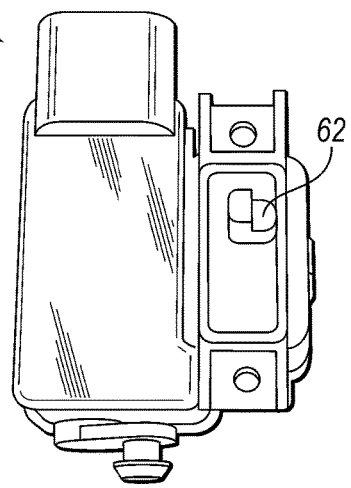
FIG. 4B is an isometric view of a locking device that is secured to the charging port of FIG. 4A.
Figure 5:
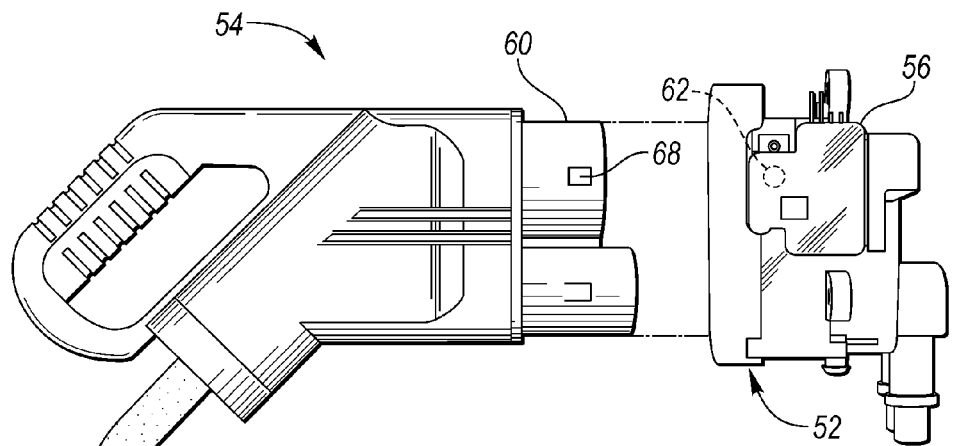
FIG. 5 is a side view illustrating a second embodiment of a connector from an external power source and the coupling between the connector and the charging port of FIG. 4A.
Figure 5:
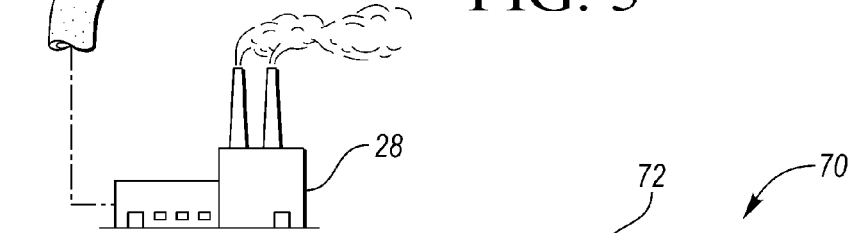

Referring to FIGS. 4A, 4B, and 5, second embodiments of a charging port 52, a connector 54 to an external power source 28, and a locking device 56 are illustrated. The charging port 52 includes profile details and electrical connections that are meant to mate with matching profile details and electrical connections of the connector 54. The profile of the charging port 52 includes a first receiving space 58 that engages a mating component 60 on the connector 54.

The locking device 56 is connected to the charging port 52. The locking device 56 transitions between an unlocked condition and a locked condition in order to lock or unlock the connector 54 to the charging port 52. The locking device 56 includes a locking pin 62. The locking pin 62 is located externally of the first receiving space 58 when in a retracted position 64 and is configured to protrude into the first receiving space 58 when in an advanced position 66. The locking device 56 may include an electrical actuator that advances the locking pin 62 between the retracted position 64 and advanced position 66 when energized, and maintain the retracted position 64 or advanced position 66 when de-energized. The locking pin 62 is configured to lock the connector 54 to the charging port 52 by extending into a window 68 located on the mating component 60 of the connector 54 when the locking pin 62 is in the advanced position 66. When the locking pin 62 is in the retracted position 64 the connector 54 may be freely inserted or retracted from the charging port 52.

The locking pin 62 is positioned such that it is aligned with a window 68 located on a side portion of the mating component 60. The locking pin 62 and window 68, however, may be relocated to other respectively aligned locations on the mating component 60 (or other mating components) of the connector 54 and charging port 52. For example, the window 68 may be located on the top of the mating component 60 while the locking device 56 is located on the top of the charging port 52 such that the locking pin 62 is now aligned with the window 68 located on the top of the mating component 60.

The external power source 28 may be a power grid including power generating plants, batteries, generators, or any other external power source that is capable of recharging a battery. The external power sources may be electrical power sources that are comprised of either direct current or alternating current.

The mechanical and electrical connections between the various embodiments of the charging port, the connector that connects the charging port to an external power source, and the locking device described herein are meant to be illustrative and should not be construed as limiting. This disclosure should be construed to include all electric vehicle charging ports that have locking devices and the respective connectors that connect electric vehicle charging ports to an external power source.

Figure 6:
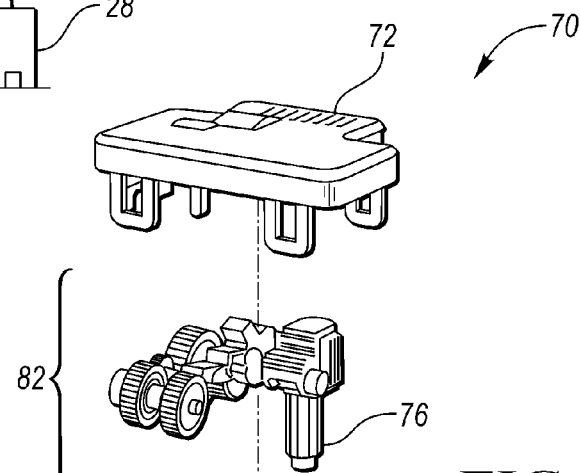
FIG. 6 is an exploded view of a locking device.
Figure 6:
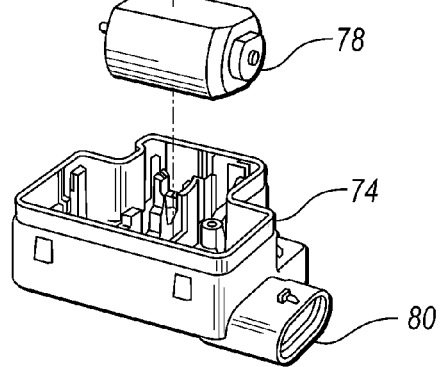

Referring to FIG. 6, and exploded view of a locking device 70 is depicted. The description of the locking device 70 may also be applicable to the two previously described locking devices 30 and 56. The locking device 70 includes a first outer housing 72 and a second outer housing 74. The locking device 70 also includes a locking pin 76 that is configured to transition between retracted and advanced positions (retracted and advanced positions of the locking pin 76 may correspond to locked and unlocked conditions of the locking device 70). An electrical actuator 78 may be utilized to transition the locking pin 76 between the retracted and advanced positions when energized, and maintain the retracted or advanced position when de-energized. The electrical actuator 78 may consist of an electric solenoid, an electric motor, or any other type of actuator that is capable of transitioning the locking pin 76 between the retracted and advanced positions. An electrical connector 80 may be included to provide power to the electrical actuator 78 and/or to provide a communication link between the locking device 70 and controller 18.

The locking device 70 may include a mechanical linkage 82 between the electrical actuator 78 and locking pin 76 (such as a gear train) to transition the locking pin 76 between the retracted and advanced positions. The mechanical linkage may include gears (e.g., pinion gears, bevel gears, sector gears, racks, etc.), latches, ratchets, shafts, cams, springs, or other hardware that is configured to advance and retract the locking pin when the electrical 78 actuator is energized, and maintain the retracted or advanced position when the electrical actuator 78 is de-energized.

The mechanical and electrical connections between the components of the mechanical linkage 82, the electrical actuator 78, and the locking pin 76 of the locking device 70 described herein are meant to be illustrative and should not be construed as limiting. This disclosure should be construed to include all locking devices that have an actuator.

Figure 7:
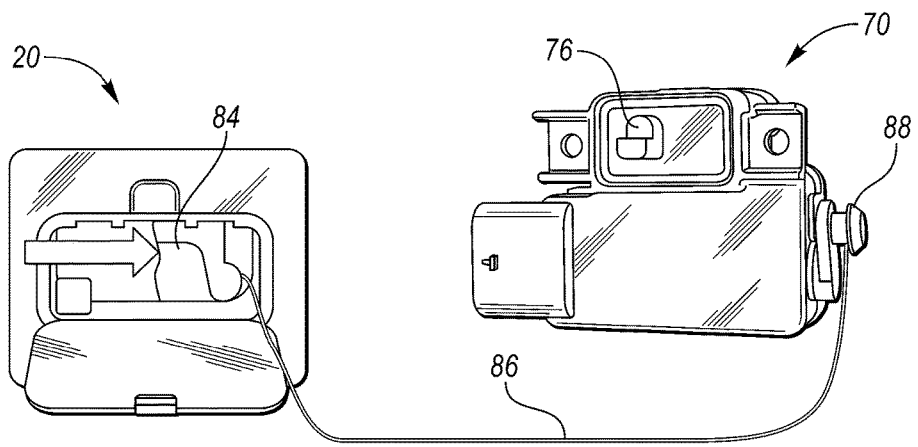
FIG. 7 is schematic diagram illustrating the mechanical connection between a locking device and a mechanical lock override.

Referring to FIG. 7, the connection between the mechanical lock override 20 and the locking device 70 is illustrated. The mechanical lock override 20 may include a handle 84 that is mechanically connected to the locking device 70, such that when a user pulls on the handle 84 the locking pin 76 transitions from the advanced position to the retracted position (the locking device 70 also transitioning from a locked condition to an unlocked condition). The mechanical connection may include a pull cable 86, such as a Bowden cable, that links the handle 84 of the mechanical lock override 20 to a releasing mechanism 88 located on the locking device 70. The releasing mechanism 88 may be a lever, sliding mechanism, or any other device that allows the locking pin 76 to transition from the advanced position to the retracted position. For example, the releasing mechanism 88 may be connected to a ratchet, cam, or other component that is utilized to lock the mechanical linkage 82 located between the electrical actuator 78 and locking pin 76, while at the same time the locking pin 76 is connected to a biasing element, such as a spring, that biases the locking pin 76 in the retracted position. Activation of the releasing mechanism 88 may release the component that locks the mechanical linkage 82, allowing the biasing element to retract the locking pin 76.

The mechanical connections between the mechanical lock override 20 and locking device 70 described herein are meant to be illustrative and should not be construed as limiting. This disclosure should be construed to include all systems that have a locking device, an actuator to transition the locking device between locked and unlocked conditions, and a mechanical lock override that is configured to override the actuator in order to transition the locking device from a locked condition to an unlocked condition.

Referring to FIGS. 8A, 8B, 8C, and 8D, the mechanical lock override 20 is further illustrated. An access door 90 is arranged to conceal the mechanical lock override 20 when in a closed position and permit access to the mechanical lock override 20 when in an open position. The sensor 22 is configured to determine an open or closed position of the access door 90. The controller 18 may be in communication with the sensor 22 and configured to terminate a battery recharging operation in response to a signal from the sensor 22 indicating that the access door is in the open position. The sensor 22 may consist of a limit switch, a micro switch, proximity switch, or any other device that is capable of determining the open or closed position of the access door 90.

Figure 8A:
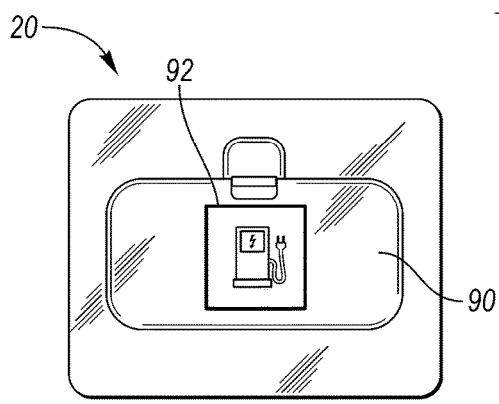
FIGS. 8A-8D illustrate the mechanical lock override and an access door to the mechanical lock override in open and closed positions.

FIG. 8A is a front view of the mechanical lock override 20 with the access door 90 in the closed position concealing the mechanical lock override 20. An intuitive logo 92 is attached to the face of the access door 90 in order to help a user recognize the function of the mechanical lock override 20.

Figure 8B:
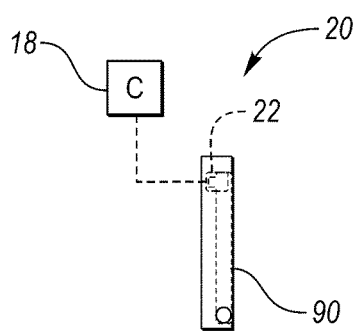

FIG. 8B is a side view of the mechanical lock override 20 with the access door 90 in the closed position. The sensor 22 is shown to be in communication with the controller 18. In this arrangement, the sensor 22 should determine a closed position of the access door 90. The controller 18 should not terminate a battery recharging operation since the access door 90 is in the closed position.

Figure 8C:
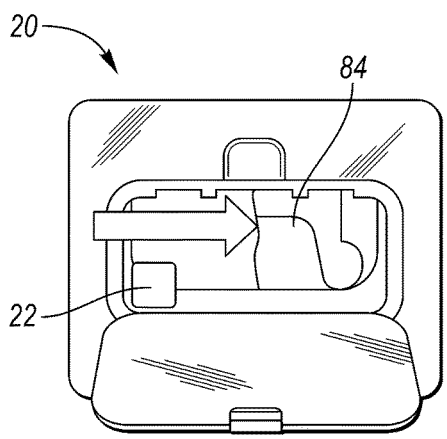

FIG. 8C is a front view of the mechanical lock override 20 with the access door 90 in the open position. The handle 84 of the mechanical lock override 20 is exposed and is accessible to a user when the access door 90 is in the open position.

Figure 8D:
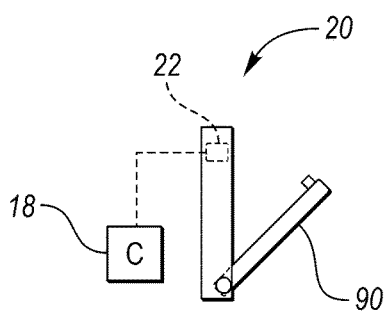

FIG. 8D is a side view of the mechanical lock override with the access door in the open position. The sensor 22 is shown to be in communication with the controller 18. In this arrangement, the sensor 22 should determine an open position of the access door 90 and a signal should be sent to the controller 18 communicating the open position of the access door 90. The controller 18 should terminate a battery recharging operation based on the signal received from the sensor 22 that the access door 90 is in the open position.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle charging system comprising:
    a charging port configured to couple to an external power source connector to recharge a battery;
    a lock configured to secure the connector to the charging port;
    an actuator configured to transition the lock between locked and unlocked conditions;
    a mechanical override disposed behind an access door and configured to unlock the lock; and
    a controller programmed to, in response to opening the access door, terminate a battery recharging operation.

2. The vehicle charging system of claim 1, wherein the actuator is an electric solenoid configured to advance a locking pin between an advanced position and a retracted position.

3. The vehicle charging system of claim 1, wherein the actuator is an electric motor configured to advance a locking pin between an advanced position and a retracted position.

4. The vehicle charging system of claim 1, wherein the mechanical override further comprises a handle and the lock is configured to transition from the locked condition to the unlocked condition when a user pulls the handle.

5. The vehicle charging system of claim 4, further comprising a pull cable mechanically linking the handle to the lock.

6. A vehicle comprising:
    a charging port configured to couple to a connector of an external power source to recharge a battery;
    a lock configured to secure the connector to the charging port;
    an electrical actuator configured to transition the lock between a locked condition and an unlocked condition when energized, and maintain the locked or unlocked condition when de-energized;
    a mechanical lock override configured to transition the lock to the unlocked condition;
    an access door arranged to conceal the mechanical lock override when closed and permit access to the mechanical lock override when open; and
    a controller programmed to, in response to a signal indicating that the access door is open, terminate a battery recharging operation.

7. The vehicle of claim 6, wherein the actuator is an electric solenoid configured to advance a locking pin between an advanced position and a retracted position.

8. The vehicle of claim 6, wherein the actuator is an electric motor configured to advance a locking pin between an advanced position and a retracted position.

9. The vehicle of claim 6, wherein the mechanical lock override is spaced apart from the charging port.

10. The vehicle of claim 6, wherein the mechanical lock override further comprises a handle and wherein the lock is configured to unlock when a user pulls the handle.

11. The vehicle of claim 10, further comprising a pull cable mechanically linking the handle to the lock.

12. An electric vehicle comprising:
    a charging port configured to couple to a connector of an external power source to recharge a traction battery;
    a lock configured to secure the connector to the charging port when in a locked condition;
    an electrical actuator configured to transition the lock between the locked and an unlocked condition when energized, and maintain the locked or unlocked condition when de-energized;
    a release configured to mechanically override the electrical actuator to transition the lock from the locked condition to the unlocked condition;
    an access door arranged to conceal the mechanical release when closed and permit access to the mechanical release when open; and
    a controller programmed to, in response to a signal indicating that the access door is open, terminate a traction battery recharging operation.

13. The vehicle of claim 12, wherein the release further comprises a handle and wherein the lock is configured to transition from the locked condition to the unlocked condition when a user pulls the handle.

14. The vehicle of claim 13, further comprising a pull cable mechanically linking the handle to the lock.

* * * * *